(12) United States Patent
Schwalbe et al.

(10) Patent No.: US 10,696,232 B2
(45) Date of Patent: Jun. 30, 2020

(54) SPLIT DECK RAIL

(71) Applicant: CNH Industrial America LLC, New Holland, PA (US)

(72) Inventors: Blaine A. Schwalbe, Valders, WI (US); James Hanke, New Holstein, WI (US)

(73) Assignee: CNH Industrial America LLC, New Holland, PA (US)

( * ) Notice: Subject to any disclaimer, the term of this patent is extended or adjusted under 35 U.S.C. 154(b) by 35 days.

(21) Appl. No.: 15/815,210

(22) Filed: Nov. 16, 2017

(65) Prior Publication Data

US 2019/0143902 A1 May 16, 2019

(51) Int. Cl.
| | |
|---|---|
| *B60R 3/00* | (2006.01) |
| *E02F 9/08* | (2006.01) |
| *B60R 3/02* | (2006.01) |
| *A01D 41/12* | (2006.01) |
| *A01D 67/00* | (2006.01) |

(52) U.S. Cl.
CPC .............. *B60R 3/005* (2013.01); *B60R 3/002* (2013.01); *B60R 3/02* (2013.01); *E02F 9/0833* (2013.01); *A01D 41/1261* (2013.01); *A01D 67/00* (2013.01)

(58) Field of Classification Search
CPC .......... B60R 3/00; B60R 3/005; B60R 3/007; B60R 9/02; A01D 41/1261; E06C 5/00; E06C 5/02; E06C 5/24; E04G 5/14
See application file for complete search history.

(56) References Cited

U.S. PATENT DOCUMENTS

| | | | | |
|---|---|---|---|---|
| 2,999,556 | A * | 9/1961 | Horne ................ | A01D 41/1261 180/89.1 |
| 4,416,486 | A * | 11/1983 | McNaught ......... | B62D 33/0617 180/89.12 |
| 4,841,708 | A * | 6/1989 | Johnston ................... | E04G 1/12 249/18 |
| 5,064,022 | A * | 11/1991 | Graham .................... | B60R 3/02 182/127 |
| 5,213,367 | A * | 5/1993 | Norman, Jr. ............ | B60P 3/224 182/113 |
| 5,240,089 | A * | 8/1993 | Spera ........................ | E04G 7/26 182/186.7 |
| 5,653,459 | A * | 8/1997 | Murphy .................. | B60R 3/007 182/113 |
| 5,676,460 | A * | 10/1997 | Biberstine ............... | B01F 13/04 182/113 |

(Continued)

*Primary Examiner* — Katherine W Mitchell
*Assistant Examiner* — Shiref M Mekhaeil
(74) *Attorney, Agent, or Firm* — Rebecca L. Henkel; Rickard K. DeMille

(57) ABSTRACT

A split deck rail system including a front railing section and a rear railing section. The front railing section may include at least two vertical posts and at least two horizontal rail segments that extend to termination ends having attachment tabs. The rear railing section includes at least one vertical post, an angled rail segment, and at least two horizontal rail segments that also extend to termination end having attachment tabs. The attachment tabs may be attached to a boom rest. For instance, the boom rest may also include tabs that the various attachments tabs can be attached to. The split deck rail system can also include corresponding deck sections that an operator can stand on. Additionally, the split deck rail may include a ladder that an operator can walk up to get to the deck sections.

16 Claims, 6 Drawing Sheets

(56) References Cited

U.S. PATENT DOCUMENTS

| | | | | |
|---|---|---|---|---|
| 6,068,277 | A * | 5/2000 | Magnussen | B60R 3/02 |
| | | | | 182/127 |
| 6,179,312 | B1 * | 1/2001 | Paschke | B60R 3/02 |
| | | | | 105/444 |
| 6,390,719 | B1 * | 5/2002 | Chan | E04B 1/5806 |
| | | | | 403/205 |
| 6,913,422 | B2 * | 7/2005 | Rogers | E04G 7/307 |
| | | | | 248/219.4 |
| 7,354,050 | B2 * | 4/2008 | Brockway | B60R 3/02 |
| | | | | 182/127 |
| 7,469,915 | B2 * | 12/2008 | Horn | E06C 9/08 |
| | | | | 182/127 |
| 7,610,867 | B2 * | 11/2009 | Horn | A01C 7/208 |
| | | | | 111/200 |
| 8,033,482 | B2 * | 10/2011 | Honermann | A01M 7/0075 |
| | | | | 239/159 |
| 8,366,079 | B2 | 2/2013 | Stoffels et al. | |
| 8,511,431 | B2 * | 8/2013 | Woolley | E06C 5/36 |
| | | | | 182/106 |
| 9,683,408 | B2 * | 6/2017 | Jackson | E06C 1/16 |
| 9,803,380 | B2 * | 10/2017 | Simmons | E04G 5/067 |
| 9,816,318 | B2 * | 11/2017 | Johnson | E06C 7/183 |
| 2002/0153201 | A1 * | 10/2002 | Warford | E04F 11/025 |
| | | | | 182/115 |
| 2004/0178602 | A1 * | 9/2004 | King | B60R 3/00 |
| | | | | 280/163 |
| 2005/0236228 | A1 * | 10/2005 | Thibault | B60R 9/0423 |
| | | | | 182/127 |
| 2007/0256894 | A1 * | 11/2007 | Horn | E06C 9/08 |
| | | | | 182/127 |
| 2007/0289790 | A1 * | 12/2007 | Moen | B62D 25/10 |
| | | | | 180/69.2 |
| 2010/0264390 | A1 | 10/2010 | Cerda | |
| 2012/0073902 | A1 * | 3/2012 | Honeycutt | E04F 11/025 |
| | | | | 182/113 |
| 2012/0204362 | A1 * | 8/2012 | Honeycutt | E01D 15/24 |
| | | | | 14/71.3 |
| 2013/0048400 | A1 * | 2/2013 | Holdener | B60R 3/02 |
| | | | | 180/89.1 |
| 2014/0150188 | A1 * | 6/2014 | Allen | E04F 11/002 |
| | | | | 14/69.5 |
| 2014/0191537 | A1 * | 7/2014 | Bilbruck | E02F 9/0833 |
| | | | | 296/193.07 |
| 2014/0217345 | A1 * | 8/2014 | Stoffels | B60R 3/005 |
| | | | | 256/64 |
| 2014/0318891 | A1 * | 10/2014 | Crothers | E04G 5/14 |
| | | | | 182/113 |
| 2014/0326537 | A1 * | 11/2014 | Honeycutt | E06C 5/02 |
| | | | | 182/107 |
| 2014/0353083 | A1 * | 12/2014 | Samuel | B60R 3/005 |
| | | | | 182/87 |
| 2015/0246641 | A1 * | 9/2015 | Jayapalan | B60R 3/005 |
| | | | | 182/113 |
| 2015/0246642 | A1 * | 9/2015 | Vernickel | B60P 1/283 |
| | | | | 280/166 |
| 2015/0291101 | A1 * | 10/2015 | Koshy | E02F 9/0816 |
| | | | | 280/727 |
| 2017/0190293 | A1 * | 7/2017 | Koga | B60R 3/00 |
| 2018/0258648 | A1 * | 9/2018 | Kuo | E04F 11/1804 |
| 2018/0266075 | A1 * | 9/2018 | Miyamoto | B60K 11/02 |
| 2019/0023325 | A1 * | 1/2019 | Schwalbe | B62D 25/12 |

* cited by examiner

SPLIT DECK RAIL

FIELD OF THE INVENTION

The invention relates generally to agricultural product application equipment or agricultural machines such as self-propelled sprayers and, in particular, to a deck rail made of two separate parts that are attached to one another, including a front railing section and a back railing section.

BACKGROUND OF THE INVENTION

High-clearance sprayers are getting larger and more complex to allow for increasing coverage in a single pass, which improves application efficiency. These high-clearance sprayers have complex product delivery and rinse systems along with other engine driven accessories and systems that need inspection and servicing. Decks are provided on the sprayer that provide walkways from rear-mounted ladders to the cab and also to provide platforms for operators to stand on while inspecting and servicing the various systems of the sprayers. Additionally, railings are arranged as outer barriers for the decks. Previously, deck railings were used that included a front railing that extends from a boom rest forward along the length of a side deck and a back railing arranged behind the boom rest at the side deck. Traditionally, the back railing had a hoop-like configuration with an end of a forward post connected to the platform and an end of a rearward post connected to a ladder bracket. A rearward end of the front railing was also attached to a movable boom rest that can be moved closer to a product tank as a transport position that provides a narrower width of the sprayer. The forward end of the front railing was also movably attached to the deck by way of a complicated railing slid mechanism with a sliding bracket that received an end of a tube of the front railing. Additionally, a pair of plastic slide washers fit on a pair of posts that were slidable within a slot in the deck. This allowed the forward end of the front railing to move inwardly toward the product tank as a transport position. Such a slidable version required fabrication of the sliding bracket and additional assembly time.

SUMMARY OF THE INVENTION

A split deck rail is provided that may define a two-piece railing that is assembled to extend along an entire side deck, extending behind a boom rest and to a ladder. A front railing section and a back railing section may connect to each other at or behind a fixed boom rest. This may be done by way of a cooperating pair of tabs at ends of a pair of horizontal tube segments at a forward end of the back railing section, whereas a rearward end of the back railing section may have a single vertical post that connects to a ladder bracket. This configuration provides manufacturing and assembly simplicity.

According to one aspect of the invention, a split deck rail is provided for use with a deck located on the side of an agricultural machine, such as a high clearance sprayer including a front end, a back end, a first side, a second side, and at least one boom. The split deck rail includes a front railing section and a rear railing section. The front railing section and the rear railing section may be mounted to the first side of the agricultural machine to form a walkway along the agricultural machine.

According to another aspect of the invention, the front railing section can include a first vertical post, a second vertical post, a first horizontal rail segment, a second horizontal rail segment, a first attachment tab, and a second attachment tab. The first horizontal rail segment extends from the first vertical post to the second vertical post and beyond the second vertical post toward the back end to a first termination end. Somewhat similarly, the second horizontal rail segment extends from the first vertical post to the second vertical post and beyond the second vertical post toward the back end to a second termination end. The first horizontal rail segment and the second horizontal rail segment may be vertically offset from one another. Also, the first attachment tab may be located at the first termination end and the second attachment tab maybe located at the second termination end.

According to another aspect of the invention, the rear railing section can include a third vertical post, an angled rail segment, a third horizontal rail segment, a fourth horizontal rail segment, a third attachment tab, and a fourth attachment tab. The angled rail segment may extend from the third vertical post towards the front end. Additionally, the third horizontal rail segment may extend from the angled post toward the front end to a third termination end. Similarly, the fourth horizontal rail segment may extend from the angled post toward the front end to a fourth termination end. The third horizontal rail segment and the fourth horizonal rail segment may be vertically offset from one another. Also, the third attachment tab may be located at the third termination end and the fourth attachment tab may be located at the fourth termination end.

According to yet another aspect of the invention, the agricultural machine may have a boom rest configured to support the boom arm. For instance, the boom rest may include a fourth vertical post and an upwardly U-shaped channel that is configured to receive the at least one boom arm. The front and rear railing sections may be attached to the boom rest. More specifically, the first and third attachment tabs may be connected to a fifth tab of the boom rest and the second and fourth attachment tabs may be connected to a sixth tab of the boom rest. Additionally, the fifth tab and the sixth tab may be substantially parallel to one another, and the fifth tab and the sixth tab may have a first side facing a first direction and a second side facing a second direction that is opposite to the second direction. For instance, the first tab may be mounted to the first side of the fifth tab and the third tab may be mounted to the second side of the fifth tab. Similarly, the second tab may be mounted to the first side of the sixth tab and the fourth tab may be mounted to the second side of the sixth tab. A plurality of fasteners may be used to attach the various termination ends to the boom rest. Additionally, the at least one boom arm can be moved from a first configuration to a second configuration. In the first configuration, the at least one boom arm extends substantially perpendicular to the first side and the second side. In the second configuration, the at least one boom arm extends substantially parallel to the first side and the second side. For instance, in the second configuration the at least one boom arm is supported by the upwardly U-shaped channel.

In accordance with another aspect of the invention, the split deck rail system may also have a first deck section. For instance, the front railing section may be connected to the first deck section, and more specifically, the first vertical post and the second vertical post may be attached to the first deck section. The split deck rail system may also include a second deck section. The rear railing section can be connected to the second deck section, for instance with the third vertical post being attached to the second deck section. Further still, a ladder fastener may be attached to the second deck section.

In accordance with yet another aspect of the invention, the split deck rail is for a self-propelled agricultural sprayer with a foldable boom that can extend open to a spray position and fold inwardly to a transport position. The split deck rail system includes a front railing section and a rear railing section. The front railing section may define a front end and a back end, as well as at least one vertical post arranged at the front end, and a pair of horizontal rails. The pair of horizontal rails may be vertically spaced from each other, and each of horizontal rail has a termination end defined at the back end of the front railing section. Somewhat similarly, the rear railing section may include at least one vertical post and a pair of horizontal rails that are vertically spaced from each other. The pair of horizontal rails each has a termination end. Additionally, the ends of the pair of horizontal rails of the front railing section and the ends of the pair of horizontal rails of the rear railing section may be connected to a boom support. The boom rest supports the foldable boom when the boom arm is folded inwardly to the transport position.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
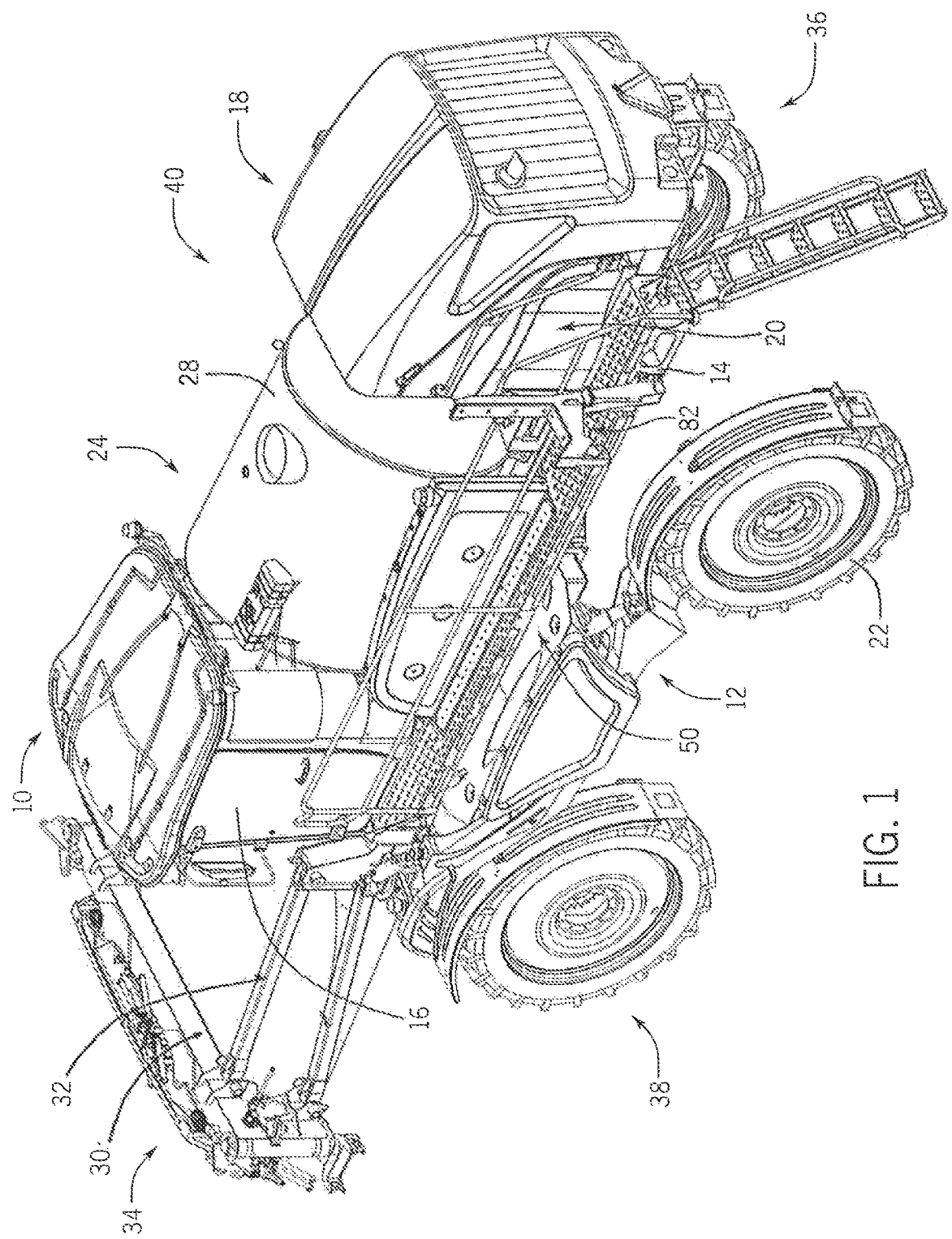
FIG. 1 is an isometric view of an agricultural machine.
Figure 2:
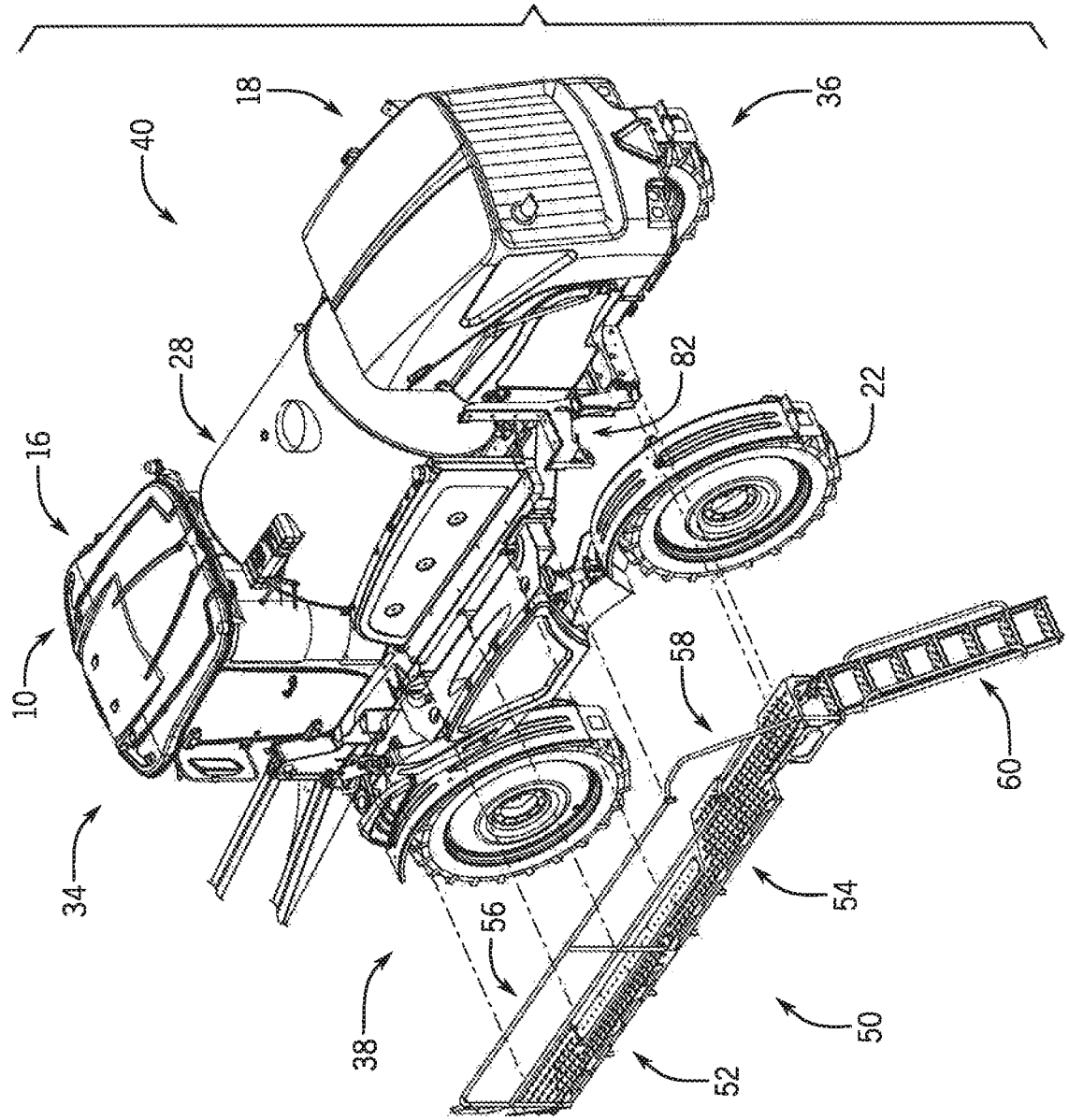
FIG. 2 is an exploded isometric view the agricultural machine with a split deck rail system isolated from the agricultural machine.
Figure 3:
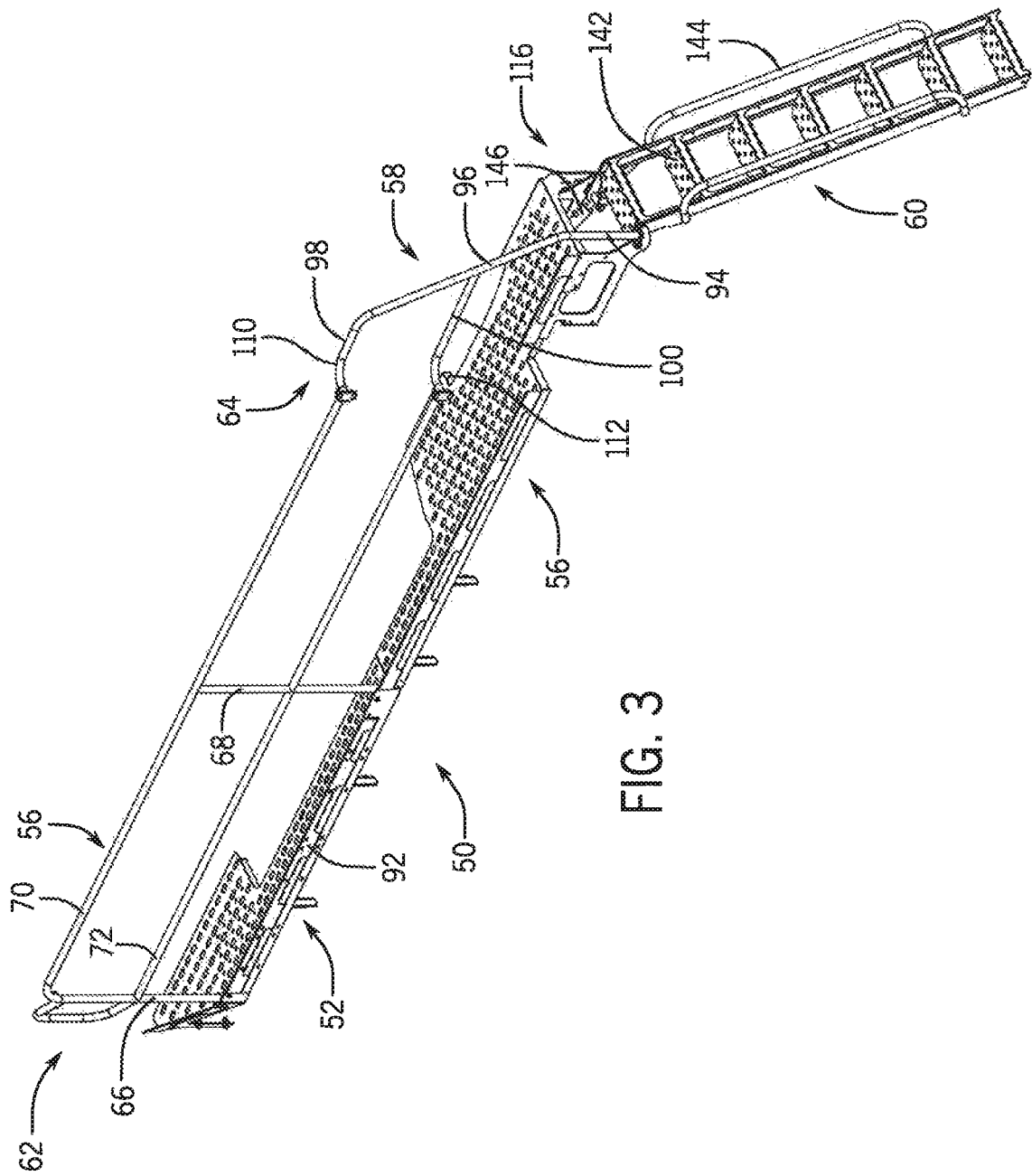
FIG. 3 is an isometric view of the split deck rail of FIG. 2 in isolation.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings.

A spray system 24 can include storage containers such as rinse tank 26 for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product. Additionally, the sprayer 10 has a front end 34, a back end 36, a first side 38, and a second side 40.

The sprayer 10 may also include a split deck rail system 50 as will be further described. The split deck rail system 50 is used in combination with at least one deck section, and as shown a first deck section 52 and a second deck section 54, to provide a safety railing adjacent the deck sections 52, 54, which forms a walkway about the respective side(s) of the sprayer 10. The split deck rail system 50 may include a front railing section 56 and a rear railing section 58 as will further be described below. Additionally, the split deck rail system 50 may include a ladder 60 that allows an operator to get onto the first deck section 52 and the second deck section 54.

The front railing section 56 may include a front end 62, a back end 64, a plurality of vertical posts, and a plurality of horizontal rail segments. For instance, as shown, the front railing section 56 has a first vertical post 66 and a second vertical post 68 spaced apart from the first vertical post 66. Additionally, the front railing section 56 may include a first horizontal rail segment 70 and a second horizontal rail segment 72. The first horizontal rail segment 70 may extend from the first vertical post 66 to the second vertical post 68 and beyond the second vertical post 68 toward the back end 36 to a first termination end 74. A first attachment tab 76 may be located at the first termination end 74 that may be used to help secure the front railing section 56 to the sprayer 10. Similarly, the second horizontal rail segment 72 may extend from the first vertical post 66 to the second vertical post 68 and beyond the second vertical post 68 toward the back end 36 to a second termination end 78. A second attachment tab 80 may similarly be located at the second termination end 78, where the second attachment tab 80 may also help secure the front railing section 56 to the sprayer 10. The first and second horizontal rail segment may be vertically offset from one another. For instance, the first attachment tab 76 and the second attachment tab 80 may be attached to a boom rest 82, which will be further described below. Of course, the front railing section 56 could feature additional vertical posts and additional horizontal rail sections as desired. Similarly, not all of the vertical posts or horizontal rails described above and shown in the figures need to be included. Additionally, it should be noted that while the posts are described as vertical and various rail segments are described as horizontal, the posts and rail segments need not be literally vertical or horizontal, but rather may be substantially vertical or substantially horizontal relative to the sprayer 10.

Figure 4:
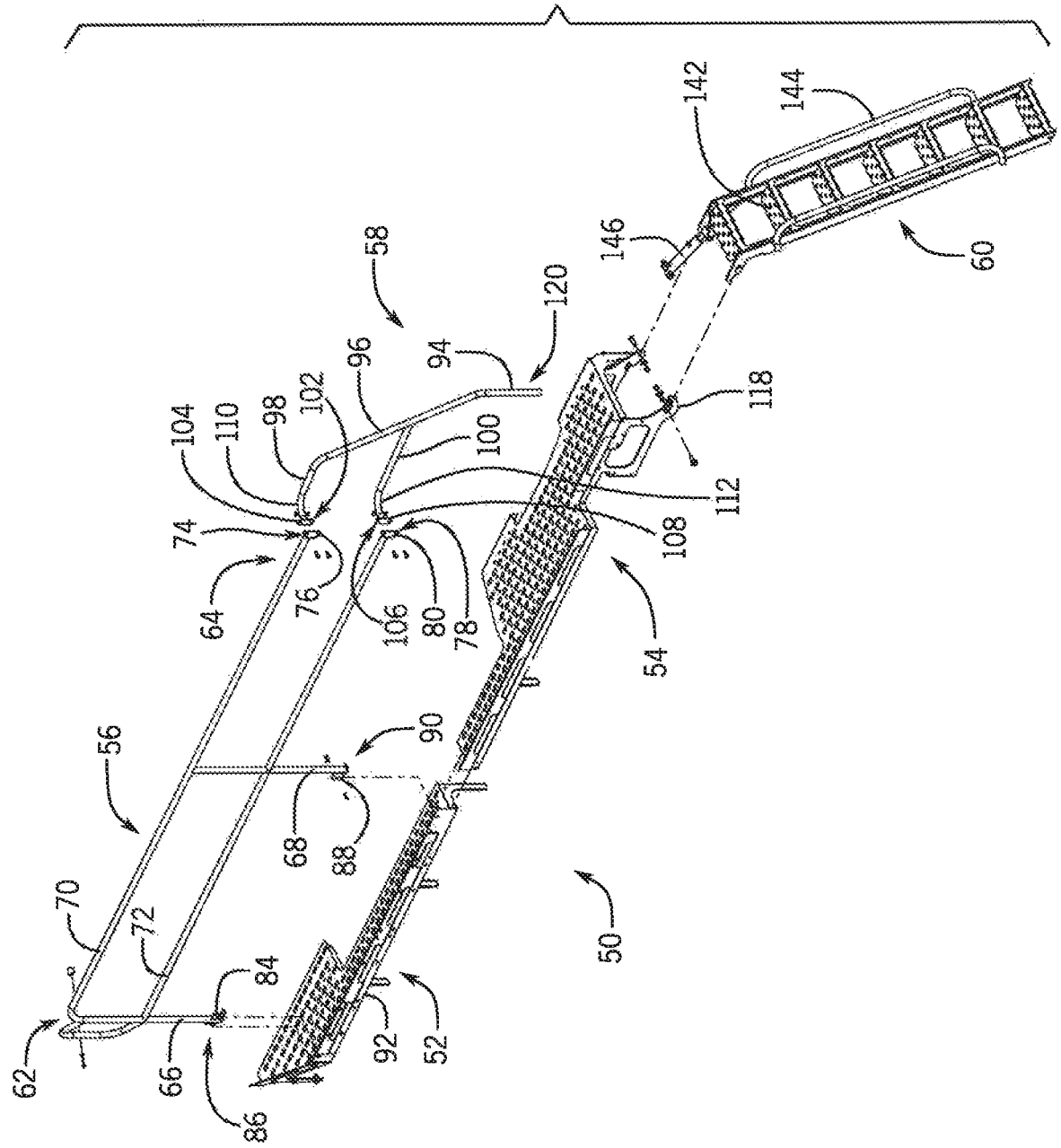
FIG. 4 is a top exploded isometric view of the split deck rail of the agricultural machine of FIG. 3.
Figure 5:
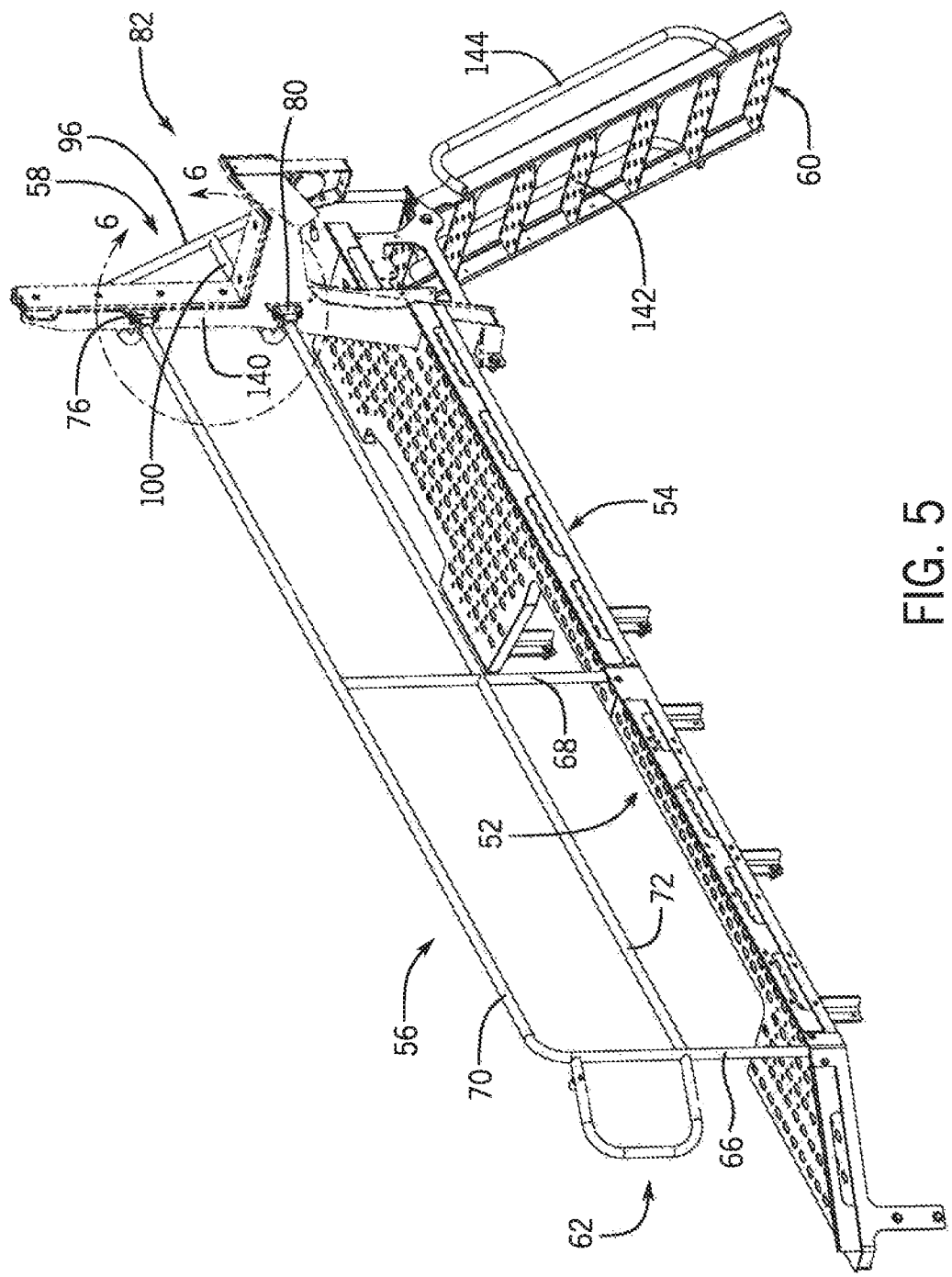
FIG. 5 is another isometric view of the split deck rail of FIG. 2-4 in isolation.

The front railing section 56 may be attached to a portion of the deck. For instance, as shown the front railing section 56 is attached to the first deck section 52. More specifically, the first vertical post 66 and the second vertical post 68 are attached to the first deck section 52. Looking to FIG. 4, the first vertical post 66 may include a seventh tab 84 that extends from a bottom portion 86 of the first vertical post 66. Similarly, the second vertical post 68 may include an eighth tab 88 that extends from a bottom portion 90 of the second vertical post 68. The front railing section 56 may be secured to the first deck section 52 by fasteners that are inserted into a side frame or side lip 92 of the first deck section 52 and into the seventh tab 84 and the eighth tab 88.

The rear railing section 58 may include at least one vertical post, at least one angled rail segment, and a plurality of horizontal rail segments. For instance, as shown the rear railing section 58 has a third vertical post 94. Additionally, an angled rail segment 96 may extend from the third vertical post 94 towards the front end 34. Further still, a third horizontal rail segment 98 and a fourth horizontal rail segment 100 may extend from the angled rail segment 96. More specifically, the third horizontal rail segment 98 may extend from the angled rail segment 96 toward the front end 34 of the sprayer 10 to a third termination end 102. A third attachment tab 104 may be located at the third termination end 102, where the third attachment tab 104 may be used to secure the rear railing section 58 to the sprayer 10.

Similarly, the fourth horizontal rail segment 100 may extend from the angled rail segment 96 toward the front end 34 of the sprayer 10 to a fourth termination end 106. A fourth attachment tab 108 may be located at the fourth termination end 106. The fourth attachment tab 108 may be used to help secure the rear railing section 58 to the sprayer 10. Also, the third horizontal rail segment 98 may be vertically offset from the fourth horizontal rail segment 100. The third termination end 104 and the fourth termination end 106 may be attached to the boom rest 82, which will be further described below.

Additionally, the rear railing section 58 may have curved sections associated with the third termination end 102 and the fourth termination end 106. More specifically, the third termination end 102 may have a first curved section 110 extending from the third horizontal rail segment 98 to the third attachment tab 104. Similarly, the fourth termination end 106 may have a second curved section 112 extending from the fourth horizontal rail segment 100 to the fourth attachment tab 108. These curved sections 110, 112 can account for an offset between the front railing section 56 and the rear railing section 58 at the boom rest 82. Of course, the rear railing section 58 could also feature additional vertical posts, additional horizontal rail sections, angled rail sections, and curved sections as desired. Similarly, each of the vertical post, the angled rail segment, and the plurality of horizontal rail segments described above and shown in the figures need not be included in all embodiments.

As shown, the second deck section 54 abuts the first deck section 52. The first deck section 52 and the second deck section 54 may be connected to one another using fasteners, or the first deck section 52 and the second deck section 54 could simply be attached to the sprayer 10 directly abutting one another. Like the first deck section 52, the second deck section 54 has a similar side frame or side lip 114, such that there is a continuous side frame or side lip that extends along the length of the deck. At the rear end 116 of the second deck section 54, an opening 118 may be formed that is configured to receive a bottom portion 120 of the third vertical post 94 of the rear railing section 58. As shown, this opening 118 is located directly adjacent to the ladder 60. As a result, the third vertical post 94 may be grasped by an operator to get onto the second deck section 54 after climbing the ladder 60.

Figure 6:
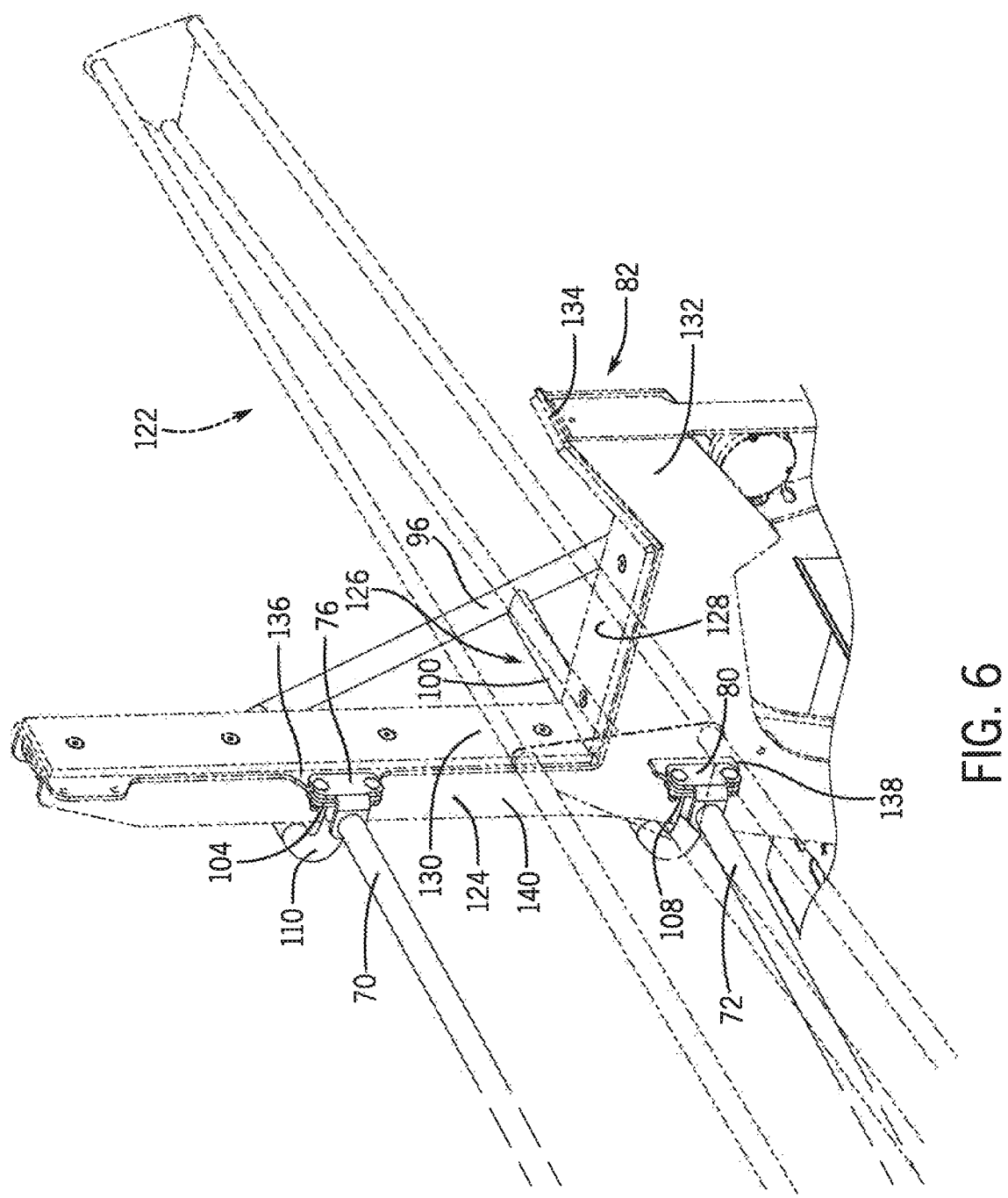
FIG. 6 is a detailed isometric view of attachment tabs associated with the split deck rail, taken generally along line 6-6 of FIG. 5.

The sprayer 10 may also include a boom rest 82. The boom rest 82 is configured to support a portion of the boom arm 122 operatively connected to boom 30 when the boom arm 122 is rotated into a resting position as shown in FIG. 6. The boom rest 82 may include a fourth vertical post 124 and an upwardly U-shaped channel 126 that is configured to receive the at least one boom arm 122. The upwardly U-shaped channel 126 may include a base 128, a first vertical section 130, and an angled section 132. The first vertical section 130 may extend along the fourth vertical post 124. The angled section 132 is configured to help bias the boom arm 122 down and into the upwardly U-shaped channel 126, such that the boom arm 122 rests upon the base 128. Additionally, the angled section 132 forms a lip 134 that prevents disengagement of the boom arm 122 out of the upwardly U-shaped channel 126.

In use, the sprayer 10 can be moved from a first configuration to a second configuration, in the first configuration, at least one boom arm 122 extends substantially perpendicular to the first side 38 and the second side 40. This first configuration is for when the sprayer 10 is in a spray position used to deliver materials to a field. In the second configuration, the at least one boom arm 122 is folded inwardly such that it extends substantially parallel to the first side 38 and the second side 40. This second configuration is for when the sprayer 10 is not delivering materials to the field, but rather is for when the sprayer 10 is in a transport position. By moving the boom arm 122 to the second configuration, the overall width of the sprayer 10 can be minimized to facilitate transport of the sprayer 10.

Additionally, the boom rest 82 may also have tabs that extend from the fourth vertical post 124. For instance, the boom rest 82 may include a fifth attachment tab 136 and a sixth attachment tab 138, shown connected to boom rest 82 which may be done by welding to the rest of the boom rest 82 weldment or extends and an integral tab(s) from a plate of the boom rest 82 weldment, or otherwise be connected to boom rest 82. As can best be seen in FIG. 6, both the fifth attachment tab 136 and the sixth attachment tab 138 may extend substantially perpendicular from a front edge 140 of the boom rest 82 towards the front end 34 of the sprayer 10. The fifth attachment tab 136 and sixth attachment tab 138 are vertically offset from one another, with the offset being substantially the same distance as the offset between the first attachment tab 76 and the second attachment tab 80 as well as the offset between the third attachment tab 104 and the fourth attachment tab 108. Additionally, the fifth attachment tab 136 and the sixth attachment tab 138 may be substantially parallel with one another. Both the fifth attachment tab 136 and the sixth attachment tab 138 have a first side and a second side. The first side may face a first direction and the second side may face a second direction, with the first direction being opposite the second direction.

As previously stated, the front railing section 56 and the rear railing section 58 may be attached to the boom rest 82. For instance, the front railing section 56 and the rear railing section 58 may be attached to the fourth vertical post 124. Alternatively, the front railing section 56 and the rear railing section 58 may be attached to the fifth attachment tab 136 and the sixth attachment tab 138. Still looking to FIG. 6, the first attachment tab 76 and the third attachment tab 104 may be attached to the fifth attachment tab 136. More specifically, the first attachment tab 76 could be mounted to the first side of the fifth attachment tab 136 and the third attachment tab 104 could be mounted to the second side of the fifth attachment tab 136. Similarly, the second attachment tab 80 and the fourth attachment tab 108 could be attached to the sixth attachment tab 138. The second attachment tab 80 could be mounted to the first side of the sixth attachment tab 138 and the fourth attachment tab 108 could be mounted to the second side of the sixth attachment tab 138. A plurality of fasteners, as known to those of ordinary skill in the art, may be used to secure these tabs 76, 80, 104, 108, 136, 138 to one another and/or to the boom rest 82.

As shown, the split deck rail system 50, including the various deck sections 52, 54 as well as the front railing section 56, the rear railing section 58, and the boom rest 82, is located on one side of the sprayer 10. As shown, these components are located on the first side 38 of the sprayer 10. By having the split deck rail system 50 only on one side of the sprayer 10, the overall width of the sprayer 10 may be minimized. That said, split deck rail systems 50 may be included on both the first side 38 and the second side 40 of the sprayer 10, when desired.

As mentioned above, the ladder 60 may be attached to the second deck section 54. As shown in the figures, the ladder 60 may have a plurality of steps 142, as well as railings 144 located on either side of the steps 142. Additionally, the ladder 60 may be rotatably movable relative to the second deck section 54. More specifically, the ladder 60 may be pivotably mountable to the second deck section 54 about a plurality of fasteners. Additionally, a hydraulic actuator 146 may be mounted to the ladder 60 and the second deck section 54 to facilitate automated movement of the ladder 60 up and down relative to the second deck section 54. This allows the ladder 60 to be rotated upwardly toward the second deck section 54 into a folded configuration.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A split deck rail system for an agricultural machine with a front end, a back end, a first side, and a second side, the system comprising:
   a front railing section comprising:
     a first vertical post;
     a second vertical post;
     a first horizontal rail segment extending from the first vertical post to the second vertical post and beyond the second vertical post toward the back end to a first termination end;
     a second horizontal rail segment extending from the first vertical post to the second vertical post and beyond the second vertical post toward the back end to a second termination end, wherein the first horizontal rail segment is vertically offset from the second horizontal rail segment;
     a first attachment tab at the first termination end;
     a second attachment tab at the second termination end;
   a rear railing section comprising:
     a third vertical post;
     an angled rail segment extending from the third vertical post towards the front end;
     a third horizontal rail segment extending from the angled rail segment toward the front end to a third termination end;
     a fourth horizontal rail segment extending from the angled rail segment toward the front end to a fourth termination end, wherein the third horizontal rail segment is vertically offset from the fourth horizontal rail segment;
     a third attachment tab at the third termination end;
     a fourth attachment tab at the fourth termination end;
   a walkway extending from the first vertical post to the third vertical post and lying in a plane generally parallel to and vertically spaced below the first, second, third and fourth horizontal rail segments; and
   a boom rest positioned adjacent to the first and second termination ends and projecting upwardly in a vertical direction perpendicular to and beyond the first and third horizontal rail segments;
   wherein:
     the first and third attachment tabs share a first common connection point at the boom rest to interconnect the front and rear railing sections; and the second and fourth attachment tabs share a second common connection point at the boom rest to interconnect the front and rear railing sections.

2. The split deck rail system for the agricultural machine of claim 1, wherein the front railing section and the rear railing section are mounted to the first side of the agricultural machine.

3. The split deck rail system for the agricultural machine of claim 1, further comprising a first deck section;
   wherein the first vertical post and the second vertical post are attached to the first deck section.

4. The split deck rail system for the agricultural machine of claim 3, further comprising a second deck section;
   wherein the rear railing section is located adjacent to the second deck section.

5. The split deck rail system for the agricultural machine of claim 4, further comprising a ladder attached to the second deck section.

6. The split deck rail system for the agricultural machine of claim 1, wherein the boom rest includes a fifth attachment tab and a sixth attachment tab;
   wherein the first attachment tab and the third attachment tab are connected to the fifth attachment tab; and
   wherein the second tab and the fourth attachment tab are connected to the sixth attachment tab.

7. The split deck rail system for the agricultural machine of claim 6, wherein the first attachment tab is mounted to a first side of the fifth attachment tab;
   wherein the third attachment tab is mounted to a second side of the fifth attachment tab;
   wherein the second attachment tab is mounted to a first side of the sixth attachment tab; and
   wherein the fourth attachment tab is mounted to a second side of the sixth attachment tab.

8. The split deck rail system for the agricultural machine of claim 6, wherein the fifth attachment tab and the sixth attachment tab are substantially parallel to one another;
   wherein the fifth attachment tab and the sixth attachment tab have a first side facing a first direction;
   wherein the fifth attachment tab and the sixth attachment tab have a second side facing a second direction;

wherein the first direction is opposite the second direction;
wherein the first attachment tab is mounted to the first side of the fifth attachment tab;
wherein the third attachment tab is mounted to the second side of the fifth attachment tab;
wherein the second attachment tab is mounted to the first side of the sixth attachment tab; and
wherein the fourth attachment tab is mounted to the second side of the sixth attachment tab.

9. The split deck rail system for the agricultural machine of claim 1, wherein the boom rest defines a fourth vertical post, and includes:
an upwardly U-shaped channel configured to receive a boom arm.

10. The split deck rail system for the agricultural machine of claim 9, wherein the front railing section is attached to the fourth vertical post; and
wherein the rear railing section is attached to the fourth vertical post.

11. A split deck rail system for an agricultural machine with a front end, a back end, a first side, and a second side, the system comprising:
a front railing section comprising:
a first vertical post;
a second vertical post;
a first horizontal rail segment extending from the first vertical post to the second vertical post and beyond the second vertical post toward the back end to a first termination end;
a second horizontal rail segment extending from the first vertical post to the second vertical post and beyond the second vertical post toward the back end to a second termination end, wherein the first horizontal rail segment is vertically offset from the second horizontal rail segment;
a rear railing section comprising:
a third vertical post;
an angled post extending from the third vertical post towards the front end;
a third horizontal rail segment extending from the angled post toward the front end to a third termination end;
a fourth horizontal rail segment extending from the angled post toward the front end to a fourth termination end, wherein the third horizontal rail segment is vertically offset from the fourth horizontal rail segment;
a boom rest positioned adjacent to the first and second termination ends of the first and second rail segments, respectively, comprising:
a fourth vertical post projecting upwardly in a vertical direction perpendicular to and beyond the first and third horizontal rail segments;
an upwardly U-shaped channel; and
a first attachment tab at the first termination end; a second attachment tab at the second termination end; and a third attachment tab at the third termination end; a fourth attachment tab at the fourth termination end; wherein:
the first and third attachment tabs share a first common connection point at the boom rest to interconnect the front and rear railing sections; and the second and fourth attachment tabs share a second common connection point at the boom rest to interconnect the front and rear railing sections.

12. The split deck rail system for the agricultural machine of claim 11, further comprising:
a first attachment tab at the first termination end;
a second attachment tab at the second termination end;
a third attachment tab at the third termination end;
a fourth attachment tab at the fourth termination end;
a fifth attachment tab extending from the boom rest; and
a sixth attachment tab extending from the boom rest;
wherein the fifth attachment tab is vertically offset from the sixth attachment tab.

13. The split deck rail system for the agricultural machine of claim 12, wherein the first attachment tab is mounted to a first side of the fifth attachment tab;
wherein the third attachment tab is mounted to a second side of the fifth attachment tab;
wherein the second attachment tab is mounted to a first side of the sixth attachment tab; and
wherein the fourth attachment tab is mounted to a second side of the sixth attachment tab.

14. The split deck rail system for the agricultural machine of claim 11, further comprising:
a first deck section; and
a second deck section;
wherein the first vertical post and the second vertical post are attached to the first deck section.

15. The split deck rail system for the agricultural machine of claim 14, further comprising a ladder rotatably connected to the second deck section.

16. A split deck rail system for an agricultural machine with a front end, a back end, a first side, and a second side, the system comprising:
a front railing section comprising:
a first vertical post;
a second vertical post;
a first horizontal rail segment extending from the first vertical post to the second vertical post and beyond the second vertical post toward the back end to a first termination end;
a second horizontal rail segment extending from the first vertical post to the second vertical post and beyond the second vertical post toward the back end to a second termination end, wherein the first horizontal rail segment is vertically offset from the second horizontal rail segment;
a rear railing section comprising:
a third vertical post;
an angled post extending from the third vertical post towards the front end;
a third horizontal rail segment extending from the angled post toward the front end to a third termination end;
a fourth horizontal rail segment extending from the angled post toward the front end to a fourth termination end, wherein the third horizontal rail segment is vertically offset from the fourth horizontal rail segment;
a boom rest positioned adjacent to the first and second termination ends of the first and second rail segments, respectively, comprising:
a fourth vertical post;
an upwardly U-shaped channel; and
a first attachment tab at the first termination end; a second attachment tab at the second termination end; and a third attachment tab at the third termination end; a fourth attachment tab at the fourth termination end; wherein:

the first and third attachment tabs share a first common connection point at the boom rest to interconnect the front and rear railing sections; and the second and fourth attachment tabs share a second common connection point at the boom rest to interconnect the front and rear railing sections.

\* \* \* \* \*